(12) United States Patent
Wang et al.

(10) Patent No.: US 8,055,317 B2
(45) Date of Patent: Nov. 8, 2011

(54) SLIDING MECHANISM AND PORTABLE ELECTRONIC DEVICE USING THE SAME

(75) Inventors: Jun Wang, Shenzhen (CN); Hsiao-Hua Tu, Taipei Hsien (TW); Gang Yang, Shenzhen (CN); Wen-Wei Song, Shenzhen (CN); Peng Zhao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 462 days.

(21) Appl. No.: 12/327,430

(22) Filed: Dec. 3, 2008

(65) Prior Publication Data
US 2009/0264168 A1    Oct. 22, 2009

(30) Foreign Application Priority Data
Apr. 16, 2008  (CN) .......................... 2008 1 0301166

(51) Int. Cl.
*H04M 1/00*  (2006.01)

(52) U.S. Cl. .................................................. 455/575.4
(58) Field of Classification Search ................ 455/575.4
See application file for complete search history.

(56) References Cited

U.S. PATENT DOCUMENTS
2007/0010284 A1 * 1/2007 Park .......................... 455/550.1
* cited by examiner

*Primary Examiner* — Lincoln Donovan
*Assistant Examiner* — Daniel Rojas
(74) *Attorney, Agent, or Firm* — Altis Law Group, Inc.

(57) ABSTRACT

A sliding mechanism includes a first plate (32) having a sliding slot (322) and a control slot (325) defined therein. The sliding slot and the control slot having a certain angle therebetween and communicating with each other. A second plate (38) is longitudinally slidably connected to the first plate. The second plate including a sliding member (381) formed on a surface thereof facing the first plate. The sliding member engages with the sliding slot and includes an elastic positioning assembly (389). A control assembly (34) is slidably received in the control slot. A main elastic member (36) has one end thereof being fixed to one end of the sliding slot, the other end thereof being fixed with the sliding member. A portable electronic device (100) using the sliding mechanism is also disclosed.

20 Claims, 7 Drawing Sheets

SLIDING MECHANISM AND PORTABLE ELECTRONIC DEVICE USING THE SAME

BACKGROUND OF THE INVENTION

1. Field of the Invention

The present invention relates to sliding mechanisms and, particularly, to a portable electronic device with two or more housings configured with a sliding mechanism such that one housing is allowed to slide with respect to another housing in a longitudinal direction.

2. Description of related art

Portable electronic devices have been increasingly widely used with a multiplicity of functions. A mobile phone is exemplified as a portable electronic device that provides wireless communication services to its subscriber while wirelessly communicating with its base station. Rapid development in the field of information and telecommunication business has made it possible for mobile users to use a variety of functions and types of mobile phones available on the market. These mobile phones are generally classified into three or more types of handsets, such as, e.g., a bar-type handset, a flip-type handset with a flip cover, and a foldable handset with a folding mechanism adapted to be opened and closed about a main body at a given angle.

The sliding type of mobile handset has recently become more widely used. The sliding-type design typically includes two housings in which one housing is slidably opened or closed with respect to the other housing. However, these sliding type mobile handsets do not yet offer a variety of different designs, and for this reason, its users may feel some inconvenience in that they have to manually slide one housing with respect to the other housing in order to open or close it.

Thus, there is room for improvement within the art.

BRIEF DESCRIPTION OF THE DRAWINGS

Many aspects of the sliding mechanism and portable electronic device using the same can be better understood with reference to the following drawings. These drawings are not necessarily drawn to scale, the emphasis instead being placed upon clearly illustrating the principles of the present sliding mechanism and portable electronic device using the same. Moreover, in the drawings like reference numerals designate corresponding parts throughout the several views.

FIG. 5 is an exploded, isometric view of the sliding mechanism shown in FIG. 3 viewed from another aspect.

DETAILED DESCRIPTION OF PREFERRED EMBODIMENTS

The present sliding mechanism is suitable for portable electronic devices with a main body and a slide unit, such as mobile phone handsets, digital cameras, etc.

Figure 1:
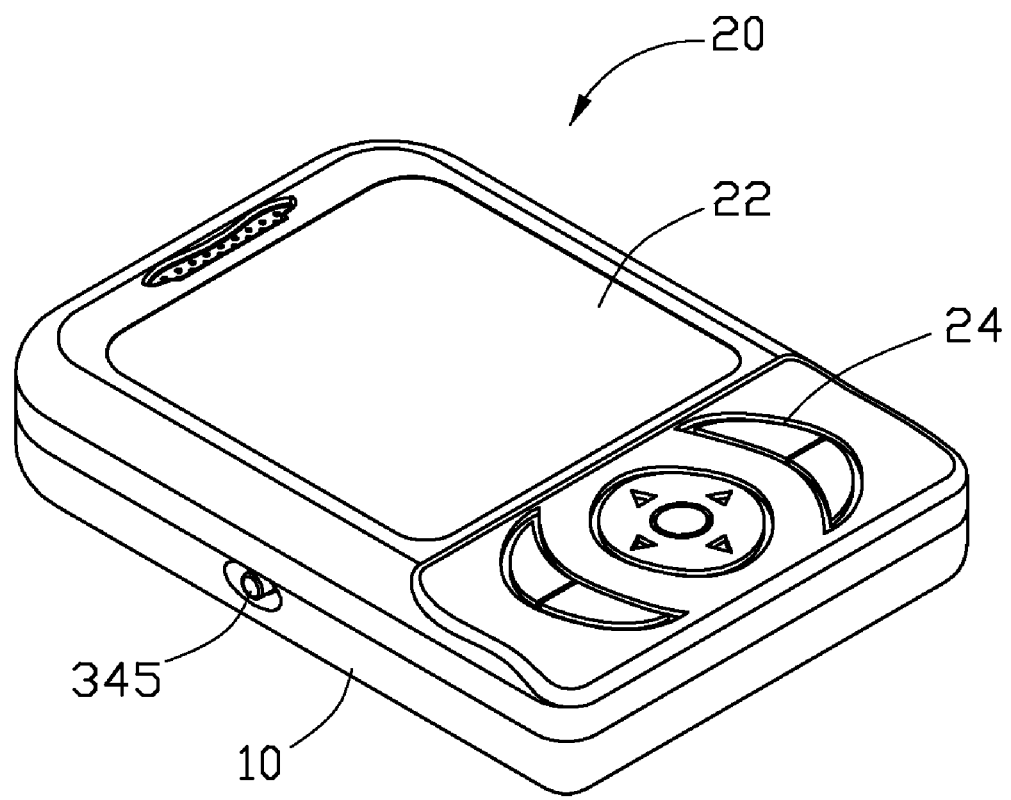
FIG. 1 is an isometric view of a mobile handset incorporating a sliding mechanism in a standby state, in accordance with a preferred embodiment.
Figure 2:
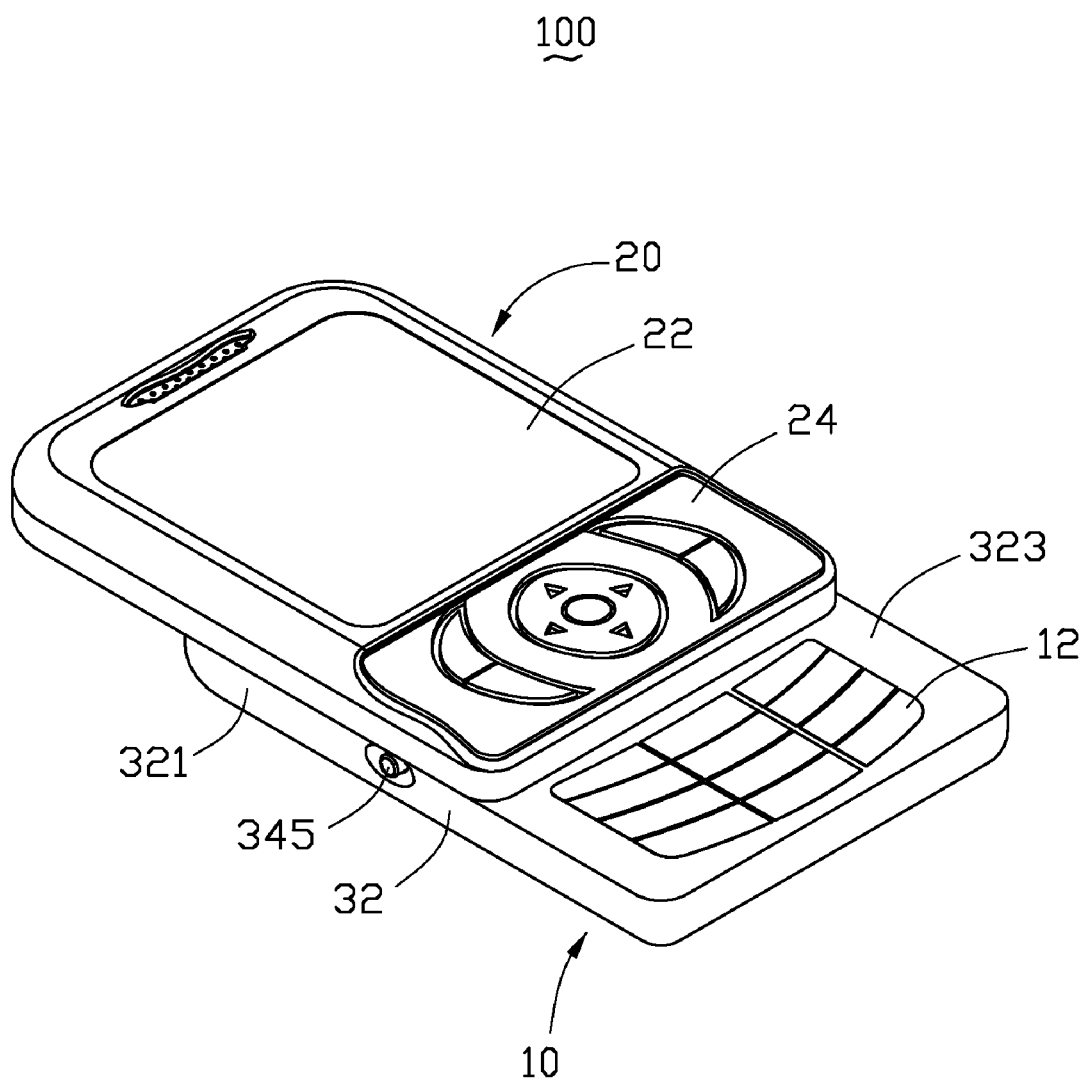
FIG. 2 is an isometric view of the mobile handset shown in FIG. 1 with a cover slid away from a base.

Referring to the drawings in detail, FIGS. 1 and 2 show an exemplary mobile phone handset 100. The mobile phone handset 100 includes a base 10 as the main body and a sliding cover 20 as the slide unit. The sliding cover 20 is oriented face-to-face with the base 10 and is slidably movable with respect thereto, due to the sliding mechanism (described below). As illustrated, the base 10 is provided with a keypad section 12 facing towards the sliding cover 20, and the sliding cover 20 is equipped with a display unit 22 and function key section 24 on its outside. When the mobile phone handset 100 is in a standby state, the keypad section 12 is protected by the sliding cover 20. Once the sliding mechanism enables the sliding cover to slide relative to the base 10, the keypad section 12 is exposed and available for use.

Figure 3:
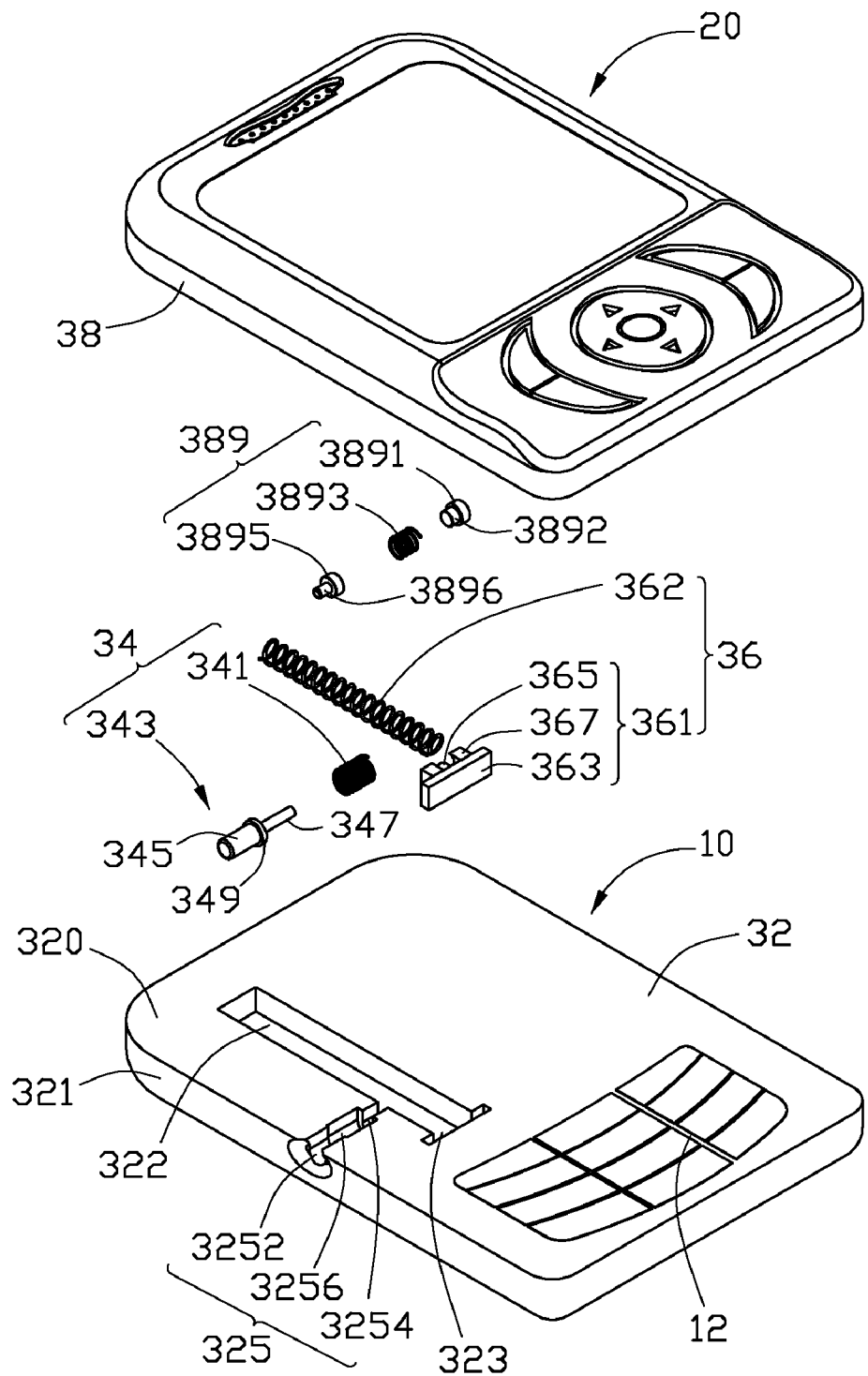
FIG. 3 is an exploded, isometric view of the sliding mechanism shown in FIG. 2.
Figure 4:
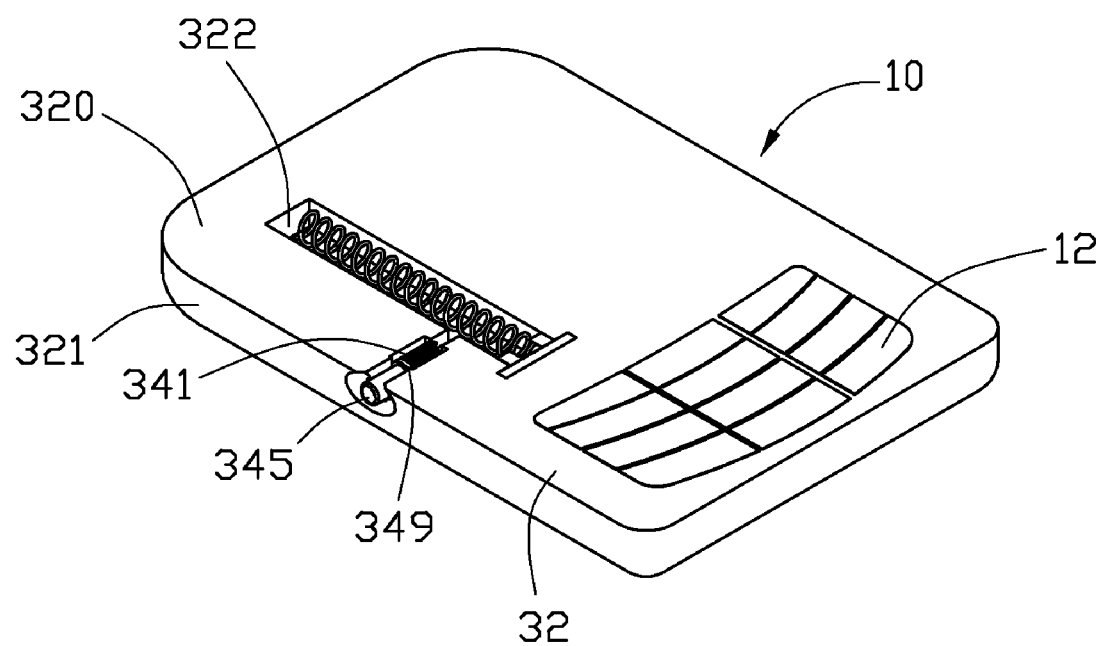
FIG. 4 is a disassembled view of a body of the mobile handset.

Referring now to FIGS. 3 and 4, the sliding mechanism includes a first plate 32, a control assembly 34, an elastic unit 36 and a second plate 38. The first plate 32 is fixed to the base 10 and the second plate 38 is fixed to the sliding cover 20. The control assembly 34 and the elastic unit 36 are both configured for positioning in the first plate 32.

The first plate 32 is generally rectangular and fixed to the base 10 by a screw or a latching mechanism (not shown). The keypad section 12 is configured adjacent to one end of the first plate 32. A sliding slot 322 is defined in the upper surface 320 of the first plate 32 beside the keypad section 12. A latching slot 323 is defined perpendicularly to the end of the sliding slot 322 near the keypad section 12. A control slot 325 is defined between the sliding slot 322 and a side surface 321 of the first plate 32. The control slot 325 communicates perpendicularly with the sliding slot 322 and the side surface 321 of the first plate 32. The control slot 325 is divided into three parts, including a first sliding area 3252 adjacent to the side surface 321, a second sliding area 3254 connected to the sliding slot 322, and a receiving area 3256 between the first sliding area 3252 and the second sliding area 3234. The diameter of the receiving area 3256 is larger than the diameters of both the first and second sliding area 3252 and 3254, and the diameter of the first sliding area 3252 is larger than the diameter of the second sliding area 3256.

The control assembly 34 includes a reset spring 341 and an operating member 343. The operating member 343 is generally cylindrical and includes a pressing portion 345 and a resisting portion 347, and a stopper portion 349 positioned between the pressing portion 345 and the resisting portion 347. The diameter of the pressing portion 345 is lager than the diameter of the resisting portion 347. The stopper portion 349 is a flange at one end of the pressing portion 345, and the diameter of the stopper portion 349 is larger than the pressing portion 345.

Referring to FIG. 4, the reset spring 341 is coiled around the resisting portion 347, and then received in the control slot 325. The pressing portion 345 is received in the first sliding area of the control slot 325 and partly exposed out of the control slot 325 for contact by a user's finger or palm. The stopper portion 349 and the reset spring 341 are retained in the receiving area 3256 of the control slot 325. The resisting portion 347 is received in the receiving area 3256 and the second sliding area 3254. The resisting portion 347 is slightly recessed in the control slot 325 and forms a space between the free end of resisting portion 347 and the sliding slot 322. One end of the reset spring 341 resists the inner wall of one end of the receiving area 3256, the other end of reset spring 341 contacts with the stopper portion 349 and abuts the inner wall of the other end of the receiving area 3256. Due to a compression force of the reset spring 341, the operating member 343 can stably received in the control slot 325.

Figure 5:
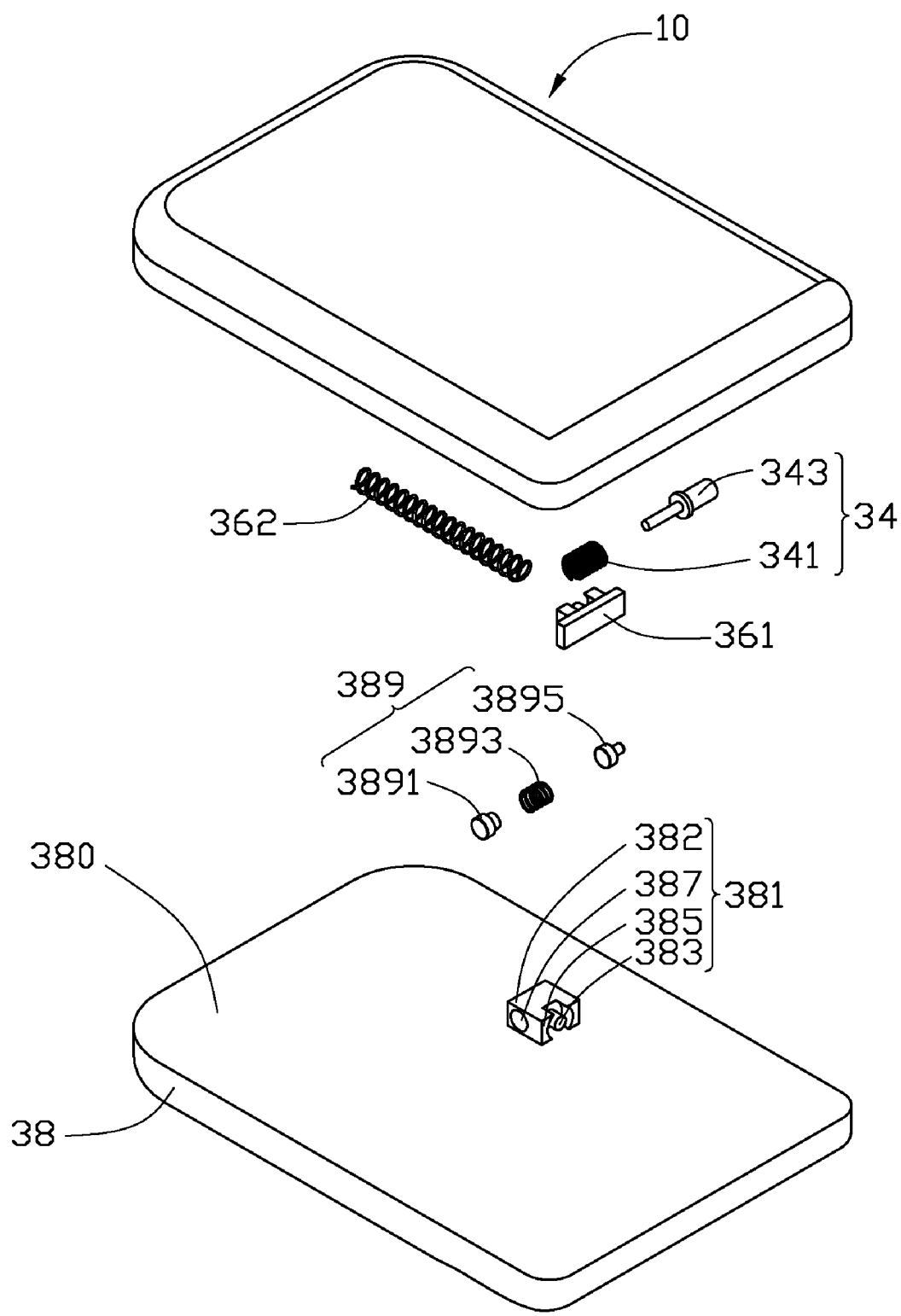
FIG. 5 is an assembled view of a body of the mobile handset.
Figure 6:
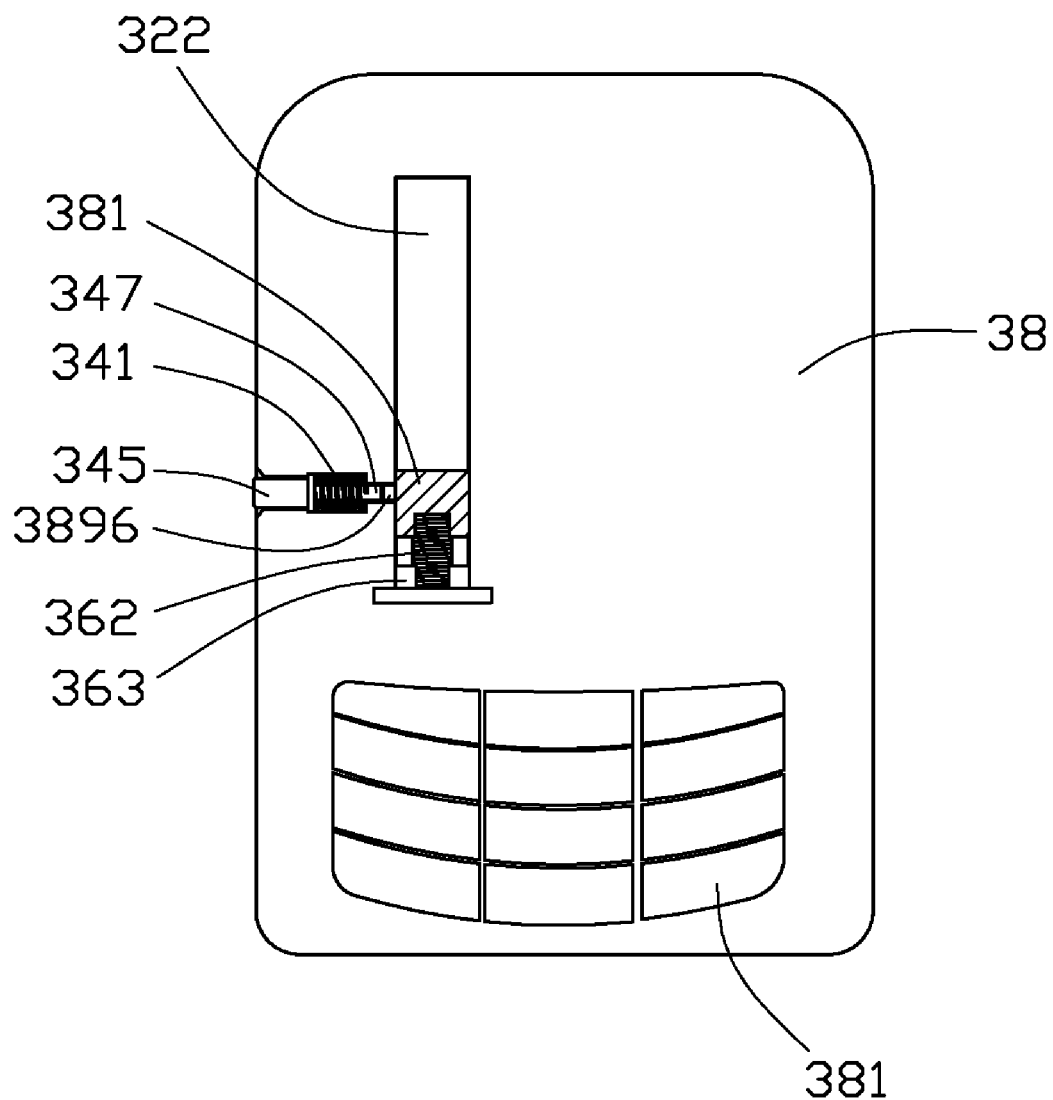
FIG. 6 is a cut-away view of the mobile handset shown in FIG. 1 along an upper surface of a main board of the sliding mechanism.
Figure 7:
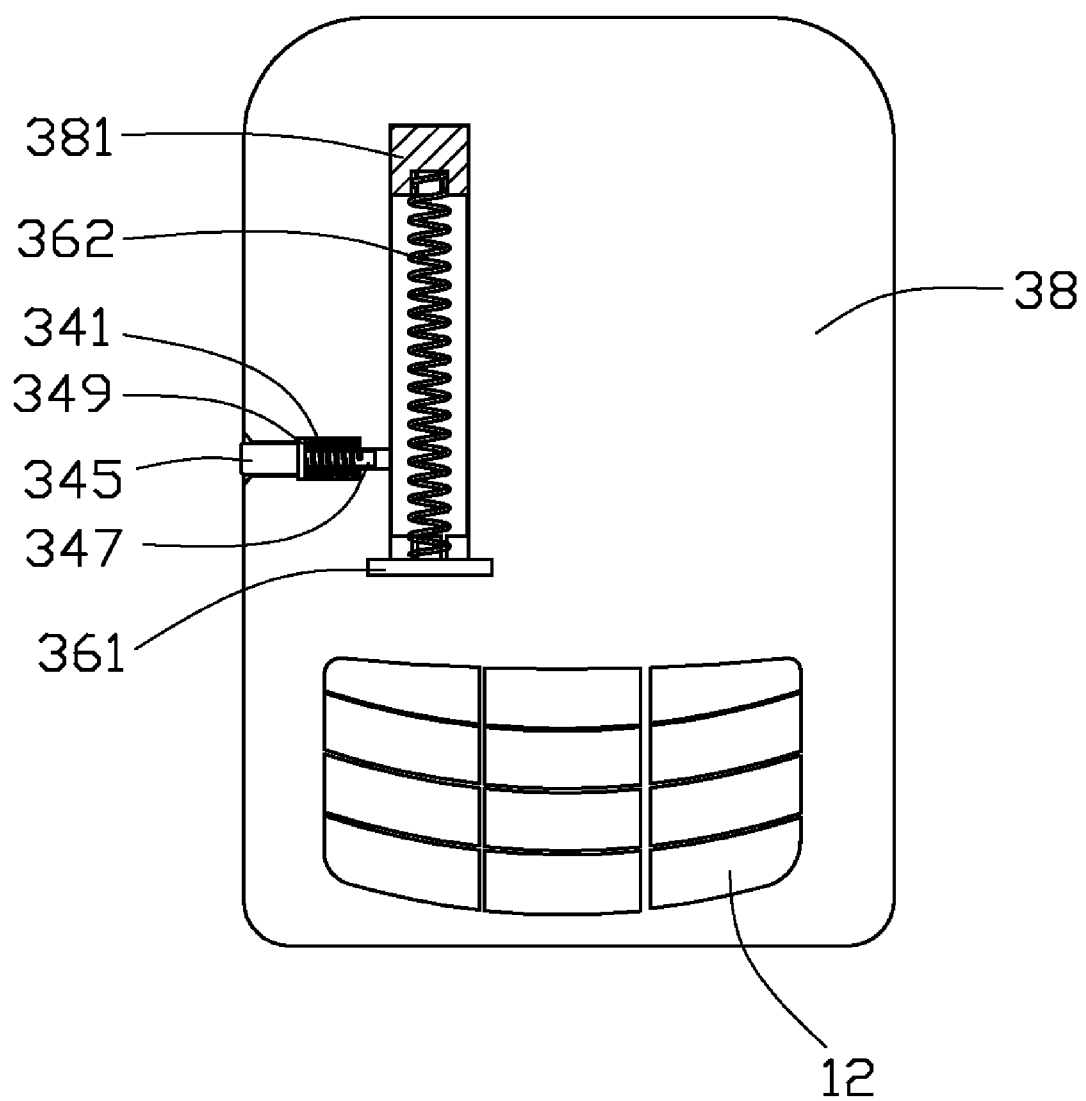
FIG. 7 is a cut-away view of the mobile handset shown in FIG. 2 along an upper surface of a main board of the sliding mechanism.

The elastic unit 36 includes a retaining member 361 and a main spring 362. The retaining member 361 includes a rectangular base 363 having a first retaining protrusion 365 protruding from a surface of the base 363. A pair of first positioning blocks 367 are configured in both sides of the first retaining protrusion 365 and form an arc space therebetween. Referring to FIG. 5, one end of the main spring 362 is coiled around the first retaining protrusion 365, and then the main spring 362 and the retaining member 361 are received in the sliding slot 322, with the base 363 of the retaining member 361 received in the latching slot 323.

The second plate 38 is generally rectangular. An exemplary second plate 38 is an inner housing of the sliding cover 20. The second plate 38 is fixed to the sliding cover 20 by a screw or a latching mechanism (not shown). A sliding member 381 protrudes from a surface 380 of the second plate 38 facing the first plate 32 and slidably cooperates with the sliding slot 322. The sliding member 381 includes a base block 382. A second retaining protrusion 383 protrudes from a surface of the base block 382. A pair of second positioning block 385 is configured in both sides of the second retaining protrusion 383 and form an arc space therebetween. One end of the main spring 362 is coiled around the second retaining protrusion 383. A through hole 387 is defined through the base block 382 and is axially perpendicular to the second retaining protrusion 383.

A positioning assembly 389 is configured and received in the through hole 387. The positioning assembly 389 includes a first sliding block 3891, a positioning spring 3893 and a second sliding block 3895. Both of the first sliding block 3891 and the second sliding block 3895 are stage-shaped columns each of which includes two columns of different diameters. A smaller end of the first sliding block 3891 is used as a first latching portion 3892 to fix the positioning spring 3893. A smaller end of the second sliding block 3895 is used as a second latching portion 3896 for positioning the sliding member 381. The first sliding block 3891, the positioning spring 3893 and the second sliding block 3895 are received in the through hole 387. One end of the positioning spring 3893 is coiled around the first latching portion 3892, the other end resists the second sliding block 3895. In a normal state of the positioning spring 3893, the second latching portion 3896 is exposed out of the through hole 387.

When being assembled, the control assembly 34 is received in the control slot 325 in the first plate 32. The retaining member 361 of the elastic unit 36 is fixed in one end of the sliding slot 322. One end of the main spring 362 is fixed to the retaining member 361. The sliding member 381 on the second plate 38 is received in the sliding slot 322 and resists the other end of the main spring 362.

When used, in a standby state, the second plate 38 is closed relative to the first plate 32. The sliding member 381 compresses the main spring 362, to make the through hole 387 face and communicate with the control slot 325. The second latching portion 3896 is inserted into the second sliding area 3254 of the control slot 325, in the space adjacent the free end of the resisting portion 347, thereby retaining the first plate 32 and second plate 38 in a fixed relative position.

If the second plate 38 should be slid away from the first plate 32, a user can press the pressing portion 345 of the control assembly 34 to cause the resisting portion 347 to push the second latching portion 3896 out from the control slot 325 and into the through hole 387. The positioning spring 3893 is compressed. With the release of the stored compression force of the main spring 341 by the release of the latching action of latching portion 3896 and control slot 325, the sliding member 381 automatically slides to the other end of the sliding slot 322. When the pressing portion 345 is released, with a compression force of the reset spring 341, the operating member 343 automatically returns to its initial position. And then, the second plate 38 slides relative to the first plate 32, and the keypad section 12 is exposed.

If the second plate 38 should be closed relative to the first plate 32, a user can push the second plate 38 along the sliding slot 322 until the sliding member 381 connects with the control slot 325, and the through hole 387 in the sliding member 381 communicates with the control slot 325. With a compression force of the positioning spring 3893, the second latching portion 3896 of the sliding member 381 is exposed out of the through hole 387 and inserted into the control slot 325. The second plate 38 stops and is latched in a fixed position relative to the first plate 32 and the keypad section 12 in the base 10 is shielded.

It should be understood that, one end of the main spring 362 can be welded or bonded with the first plate 32 in one end of the sliding slot 322, so that the latching slot 323 and the retaining member 361 can be omitted. The other end of the main spring 362 can also be fixed to the sliding member 381 by welding or bonding. Additionally, the through hole 387 can also be omitted. The first sliding block 3891, the positioning spring 3893 and the second sliding block 3895 can be an elastic member protruding on the sidewall of the sliding member instead. With an outer force, the elastic member can be shrunk to the sidewall of the sliding member 381. Furthermore, each of the reset spring 341, the main spring 362 and the positioning spring 3893 can be instead with an elastic member made of elastic material.

Moreover, a protrusion or a recess can be defined in the sidewall of the sliding slot 322 along the sliding direction of the second plate 38, another recess corresponding to the protrusion or another protrusion corresponding to the recess can be defined in a side surface of the sliding member 381 parallel to the sidewall of the sliding slot 322. The corresponding protrusion and recess engage with each other to prevent the sliding member 38 pop out of the sliding slot 322. Of course, the first plate 32 and the second plate 38 can be connected by another ways, such as by connecting rail.

A main advantage of the sliding mechanism and the portable electronic device 100 using the same is that, the second plate 38 can be slid away from the first plate 32 by only one key, that is, just by pressing the operating member 341.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism, comprising:
  a first plate defining a sliding slot and a control slot, the sliding slot and the control slot forming a predetermined angle therebetween and communicating with each other;
  a second plate longitudinally slidably connected to the first plate, the second plate including a sliding member formed on a surface thereof facing the first plate, the sliding member defining a receiving hole, the sliding member engaging with the sliding slot and including a positioning assembly, the positioning assembly received in the receiving hole, when the sliding member being near one end of the sliding slot and communicating with the control slot, a portion of the positioning assembly is partially exposed from the receiving hole, and is biased into the control slot to retain the first plate and second plate in a fixed relative position;

a control assembly slidably received in the control slot; and a main elastic member, one end of the main elastic member being fixed to one end of the sliding slot, the other end being fixed with the sliding member; when the portion of the positioning assembly biased into the control slot is pushed out of the control slot by the control assembly, the main elastic member causes the sliding member to slide automatically to the other end of the sliding slot.

2. The sliding mechanism as claimed in claim 1, wherein the control slot includes a first sliding area adjacent to a side surface of the first plate, a second sliding area connected to the sliding slot, and a receiving area between the first sliding area and the second sliding area.

3. The sliding mechanism as claimed in claim 2, wherein the control assembly includes a reset spring and an operating member, the reset spring being fixed around the operating member.

4. The sliding mechanism as claimed in claim 3, wherein the operating member includes a pressing portion at one end and a resisting portion at its other end, and a stopper portion positioned between the pressing portion and the resisting portion, the stopper portion being a flange.

5. The sliding mechanism as claimed in claim 3, wherein the pressing portion is received in the first sliding area of the sliding slot, the reset spring is coiled around the resisting portion and received in the receiving area and the second sliding area with the stopper portion and the resisting portion.

6. The sliding mechanism as claimed in claim 1, further comprising a retaining member, the retaining member including a base and a first retaining protrusion formed on a surface of the base, a pair of first positioning blocks formed on both sides of the first retaining protrusion; a latching slot being defined on the first plate near one end of the sliding slot; one end of the main elastic member is fixed to the first retaining protrusion, the base latched in the latching slot and received in the sliding slot together with the main elastic member.

7. The sliding mechanism as claimed in claim 1, wherein the sliding member includes a base, the receiving hole is defined in the base.

8. The sliding mechanism as claimed in claim 7, wherein the positioning assembly includes a first latching member, a positioning spring and a second latching member, one end of the positioning spring being coiled around the first latching member, the other end resisting the second latching member, when the positioning spring is in a normal state, the second latching member being exposed out of the receiving hole.

9. The sliding mechanism as claimed in claim 7, wherein the receiving hole is a through hole passing through the base of the sliding member.

10. The sliding mechanism as claimed in claim 7, wherein a second retaining protrusion is formed in the base of the sliding member, a pair of second positioning blocks being formed in both sides of the second retaining protrusion, the other end of the main elastic member being fixed with the second retaining protrusion.

11. A portable electronic device, comprising:
a base having a keypad section configured therein;
a sliding cover longitudinally slidably connected to the base to shield or expose the keypad; and a sliding mechanism, comprising:
a first plate defining a sliding slot, a latching slot and a control slot, the sliding slot and the control slot forming a predetermined angle therebetween and communicating with each other, the latching slot near one end of the sliding slot;
a second plate longitudinally slidably connected to the first plate, the second plate including a sliding member formed on a surface thereof facing the first plate, the sliding member engaging with the sliding slot and including a positioning assembly, when the sliding member being near one end of the sliding slot and communicating with the control slot, a portion of the positioning assembly being inserted into the control slot to retain the first plate and second plate in a fixed relative position;
a control assembly slidably received in the control slot;
a retaining member latched in the latching slot; and
a main elastic member, one end of the main elastic member being fixed to one end of the retaining member, the other end being fixed with the sliding member;
when the positioning assembly being compressed by the control assembly, the main elastic member providing a force to make the sliding member slide automatically to the other end of the sliding slot.

12. The portable electronic device as claimed in claim 11, wherein the control slot includes a first sliding area adjacent to a side surface of the first plate, a second sliding area connected to the sliding slot, and a receiving area between the first sliding area and the second sliding area.

13. The portable electronic device as claimed in claim 12, wherein the control assembly includes a reset spring and an operating member, the reset spring being fixed around the operating member.

14. The portable electronic device as claimed in claim 13, wherein the operating member includes a pressing portion at one end and a resisting portion at its other end, and a stopper portion positioned between the pressing portion and the resisting portion, the stopper portion being a flange.

15. The portable electronic device as claimed in claim 13, wherein the pressing portion is received in the first sliding area of the sliding slot, the reset spring is coiled around the resisting portion and received in the receiving area and the second sliding area with the stopper portion and the resisting portion.

16. The portable electronic device as claimed in claim 11, further comprising a retaining member, the retaining member including a base and a first retaining protrusion formed on a surface of the base, a pair of first positioning block formed in both sides of the first retaining protrusion; one end of the main elastic member is fixed to the first retaining protrusion, the base latched in the latching slot and received in the sliding slot together with the main elastic member.

17. The portable electronic device as claimed in claim 11, wherein the sliding member includes a base with a receiving hole defined therein, the positioning assembly being configured in the receiving hole and partly exposed.

18. The portable electronic device as claimed in claim 17, wherein the positioning assembly includes a first latching member, a positioning spring and a second latching member, one end of the positioning spring being coiled around the first latching member, the other end resisting the second latching member, when the positioning spring is in a normal state, the second latching member being exposed out of the receiving hole.

19. The portable electronic device as claimed in claim 17, wherein the receiving hole is a through hole passing through the base of the sliding member.

20. The portable electronic device as claimed in claim 17, wherein a second retaining protrusion is formed in the base of the sliding member, a pair of second positioning blocks being formed in both sides of the second retaining protrusion, the other end of the main elastic member being fixed with the second retaining protrusion.

* * * * *